United States Patent Office 2,776,951
Patented Jan. 8, 1957

2,776,951

AMIDES OF VINYL ETHERS CONTAINING HYDROXYL GROUPS AND POLYMERS THEREOF

Sidney Melamed, Philadelphia, Pa., assignor to Rohm & Haas Company, Philadelphia, Pa., a corporation of Delaware No Drawing. Application December 8, 1954,
Serial No. 474,005

23 Claims. (Cl. 260—78.3)

This invention is concerned with new compounds which are N-vinyloxyalkyl substituted amides which may be considered to be the reaction products of an aliphatic monocarboxylic acid of 2 to 18 carbon atoms containing at least one alcoholic hydroxyl group with an amine having the structure of Formula I:

I  $\qquad$ $CH_2=CHOANHR$ where A is a straight-chain or branched-chain alkylene group having 2 to 18 carbon atoms of which at least two in a chain separate the adjoining nitrogen and ether oxygen atoms, and R is selected from the group consisting of H, phenyl, tolyl, benzyl, cyclohexyl, and alkyl groups having from 1 to 18 carbon atoms. In referring to the carboxylic acid as an aliphatic acid, it is meant herein to include strictly aliphatic acids having a straight or branched chain as well as those acids of alicyclic type compounds and also acids of either of these types which contain aryl substituents in which the carboxyl and hydroxyl are attached directly to aliphatic carbon atoms exclusively.

Representative amines of Formula I include the following:

$$CH_2=CHOCH_2CH_2NH_2$$
$$CH_2=CHOCH_2CH_2NHCH_3$$
$$CH_2=CHOCH_2CH_2CH_2NH_2$$
$$CH_2=CHOCH_2CH(CH_3)NH_2$$
$$CH_2=CHOCH(CH_3)CH_2NH_2$$
$$CH_2=CHOCH_2C(CH_3)_2NH_2$$
$$CH_2=CHOC(CH_3)_2CH_2NH_2$$
$$CH_2=CHOCH_2CH_2CH_2CH_2NH_2$$
$$CH_2=CHOC(CH_3)_2CH_2CH(CH_3)NH_2$$
$$CH_2=CHOCH_2CH_2CH(CH_3)(CH_2)_3C(CH_3)_2NH_2$$
$$CH_2=CHOCH_2C(CH_3)_2CH_2NH_2$$
$$CH_2=CHOCH_2CH(CH_3)NHCH_3$$
$$CH_2=CHOCH(C_{16}H_{33})CH_2NH_2$$

The vinyl aminoalkyl ether may have an N-substituent (R) other than hydrogen and the preferred methyl group, such as ethyl, butyl, phenyl, methylphenyl, benzyl, cyclohexyl, and so on, typical compounds then being $$CH_2=CHOCH_2CH_2NHC_6H_5$$

(distilling at 128° to 130° C./9 mm.), $$CH_2=CHOCH_2CH_2NHC_4H_9$$

(distilling at 88° to 99° C./120 mm.), $$CH_2=CHOCH(CH_3)CH_2NHC_2H_5$$

(distilling at 72 to 73° C./120 mm.), $$CH_2=CHOCH_2CH_2NHCH_2C_6H_5$$
and
$$CH_2=CHOCH_2CH_2NHC_6H_{11}$$

in which $C_6H_{11}$ is cyclohexyl.

Representative hydroxy-monocarboxylic acids whose chlorides, esters or lactones may be reacted with the amines of Formula I to produce the amides of the invention are: glycollic, lactic, α-hydroxyutyric, α-hydroxyiso- butyric, α-hydroxy-n-valeric, α-hydroxy-isovaleric, hydracrylic (β-hydroxy-propionic), β-hydroxybutyric, β-hydroxyisobutyric, β-hydroxy-n-valeric, β-hydroxy-isovaleric, γ-hydroxybutyric, γ-hydroxy-n-valeric, delta-hydroxyvaleric, eta-hydroxycaproic, omega-hydroxynonanoic, omega-hydroxydecanoic, omega-hydroxyhendecanoic, omega-hydroxydodecanoic (sabinic), omega-hydroxytridecanoic, juniperic (omega-hydroxyhexadecanoic), 11-hydroxyhexadecanoic, 9-hydroxystearic, 10-hydroxystearic, 11-hydroxystearic, 12-hydroxystearic, glyceric, 9,10-dihydroxystearic (by oxidation of oleic acid), 9,10-dihydroxystearic (by oxidation of elaidic acid), 3,12-dihydroxypalmitic, 2,3,4-trihydroxy-n-butyric (including d-erythronic, 1-erythronic, d-threonic, 1-threonic), trihydroxyisobutyric $(HOCH_2)_2C(OH)COOH$, aleuritic (9,10,16-trihydroxypalmitic), sativic (9,10,12,13-tetrahydroxystearic), arabonic, xylonic, ribonic, lyxonic, glyconic, mannonic, galactonic, guloric, talonic, idonic, altronic, allonic, α-d-glucoheptonic, α-hydroxy-vinylacetic, ricinoleic, 3-hydroxypelargonic, tropic (α-phenyl-β-hydroxypropionic), atrolactic (α-phenyl-α-hydroxypropionic), 4-hydroxy-cyclohexane-1-carboxylic, 2-hydroxy-cyclohexane-1-carboxylic, shikimic (3,4,6-trihydroxy-cyclohexane-1-carboxylic), quinic (1,3,4,5-tetrahydroxy-cyclohexane-1-carboxylic.

One group of the amides of the present invention have the general structure of Formula II:

II  $\qquad$ $CH_2=CHOANRCOC_xH_{2x+1-y}(OH)_y$ where A and R are defined hereinabove, $x$ is an integer having a value of 1 to 17, and
$y$ is an integer having a value of 1 to 5.

This group includes the amides obtained by reacting an amine of Formula I with strictly aliphatic acids of saturated character, such as simple fatty acids having from 1 to 18 carbon atoms and which contain 1 or more hydroxyl groups.

Another group which includes the amides obtained by reacting an amine of formula I with a cyclohexane-carboxylic acid containing one or more hydroxyl groups is defined by formula III:

III $\qquad$ $CH_2=CHOANRCOR'(OH)_p$ in which $p$ is an integer having a value of 1 to 4, and
R' is an alicyclic hydrocarbon radical having 6 carbon atoms in a ring.

One important group of amides is obtained by the reaction of an amine of Formula I with a chloride, ester, or lactone of a fatty acid having up to 10 carbon atoms which contains a single hydroxyl group on a carbon having a position anywhere from the alpha position to the omega position relative to the carboxyl group. These compounds have the structure of Formula IV:

IV $\qquad$ $CH_2=CHOANRCO(CH_2)_{m-1}CH(OH)R^2$ where A and R are the same as defined above $m$ is an integer having a value of 1 to 6, and
$R^2$ is selected from the group consisting of H, $CH_3$, $C_2H_5$, $-(CH_2)_2CH_3$, and $-CH(CH_3)_2$.

An extremely important and distinctive group are the amides of formula V wherein the acyl residue or radical has a hydroxyl group attached to each carbon thereof except that connected to the nitrogen of the amide linkage.

V $\qquad$ $CH_2=CHOANRCO(-\underset{\underset{H}{\overset{O}{|}}}{\overset{H}{\underset{|}{C}}}-)_nH$ where $n$ is an integer having a value of 1 to 6.

For many purposes, water-solubility of the compounds is desirable whether the compounds be monomeric or polymeric in character. In such compounds, the symbol A is preferably ethylene or propylene and the symbol R is hydrogen or methyl.

The monomeric compounds of the present invention may be produced by reacting a vinyl ether of Formula I with the ester, lactone or acid chloride of one of the hydroxy monocarboxylic acids as defined hereinabove. When the production of the compound is accomplished by reaction of an ester or lactone with a vinyl ether of Formula I, the reaction may be effected in the presence of an alkali metal alkoxide, such as sodium methoxide in an amount of 1 to 10%, preferably about 5%, on the weight of the reactants. However, the presence of this alkoxide is not essential. The reaction may be effected in the presence of a solvent, preferably in an alcohol corresponding to the alkyl group of the ester that is reacted. Thus when a methyl ester is used, reaction in methanol is preferred. While the reaction may be effected at room temperature, shorter times are involved if higher temperatures are employed. For example, the reaction mixture may be refluxed at 60° to 80° C. or higher for 4 to 8 hours. The product may be obtained by stripping off solvent or by adding a non-solvent to effect precipitation of the product. It may be purified by recrystallization from suitable solvents, if desired.

When the acid chloride of the hydroxy monocarboxylic acid is reacted with the vinyl ether of Formula I, the reaction may be carried out in the presence of excess amine, such as two or more moles of amine to one mole of the acid chloride, or in the presence of an inorganic alkaline material such as sodium or potassium hydroxide or carbonate as an acceptor for the hydrogen chloride liberated by the reaction. The reaction is preferably carried out in a solvent, such as dioxane, ether, benzene, acetonitrile, chloroform and the like. In certain instances, where the acid chlorides are not too sensitive to water, the solvent system may be a mixture of benzene or chloroform and water, particularly where inorganic bases are used as acid acceptors. The temperature of reaction may vary widely but is preferably kept low such as from −10° to 25° C. for a period of 1 to 4 hours. When the substituent R on the nitrogen atom is other than hydrogen, the use of the acid chloride as a reactant is preferred.

The monomeric compounds of the present invention are readily polymerized and produce homopolymers as well as copolymers having a wide range of molecular weights including molecular weights of 5000 to 50,000 or more. They may be polymerized in the presence of catalysts or initiators of the acyclic azo type. In such compound the —N=N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis(α,γ - dimethylvaleronitrile), azobis(α - methylbutyronitrile), dimethyl azobismethylvalerate, and the like. In these catalysts one of the carbons bonded to the tertiary carbon atom has its remaining valences satisfied by at least one element from the class consisting of oxygen and nitrogen. Polymerization may be effected in bulk, in solution, or in emulsion systems. To effect polymerization the amidoalkyl vinyl ether and the acyclic azo catalyst are mixed directly or in the presence of an inert solvent and the mixture is maintained between 60° and 100° C. until the desired extent of polymerization is attained. Solvents that may be used in polymerization include methanol, ethanol, isopropanol, butanol, dimethylformamide, dimethylacetamide, toluene, benzene, xylene, and so on. The amount of catalyst may be varied from about 0.1 to about 5% of the weight of the monomers. The polymerization is best carried out in an inert atmosphere, such as nitrogen gas.

For polymerization in solution, concentrations of monomer from about 50% to 90% are suitable. The course of polymerization may be readily followed from the increase in viscosity of the solution. The catalyst may be added in increments if desired with or without additional solvent.

For bulk polymerization, the preferred temperatures are about 70° to 80° C. and the optimum proportion of catalyst is from 0.3% to 3% of the monomer weight.

The copolymerization may also be effected by an aqueous emulsion system using suitable emulsifying or dispersing agents, such as the higher alkylaryl polyethoxyethanols, such as the ethylene oxide modified alkyl phenols in which the alkyl group or groups has or have from 8 to 18 or more carbon atoms such as octyl, dodecyl, and octadecyl and which contain from 6 to 20 or more ethylene oxide units per molecule.

The vinyl ethers of the present invention may be copolymerized with a wide variety of compounds. Examples of monoethylenically unsaturated compounds which can thus be copolymerized with these vinyl ethers include vinylidene halides such as vinyl fluoride, vinyl chloride, vinyl bromide, vinyl iodide, 1,1-difluoroethylene, 1,1-dichloroethylene; vinylidene hydrocarbons such as isobutylene, 1,3-butadiene, styrene; halovinylidene hydrocarbons such as 2-fluoro-1,3-butadiene, 2-chloro-1,3-butadiene, 2,3-dichloro-1,3-butadiene; acrylic, haloacrylic and alkacrylic esters, nitriles and amides such as ethyl acrylate, methyl methacrylate, butyl methacrylate, methoxymethyl methacrylate, chloroethyl methacrylate, beta-diethylaminoethyl methacrylate, acrylonitrile, methacrylonitrile, acrylamide, methacrylamide, vinyl carboxylates such as vinyl formate, vinyl acetate, vinyl chloroacetate, vinyl butyrate, vinyl laurate; unsaturated aldehydes and ketones such as acrolein, methacrolein, methyl vinyl ketone; N-vinyl imides such as N-vinylphthalimide, N-vinyl succinimide; unsaturated ethers such as vinyl ethyl ether, vinyloxyethylurea, aminoethyl vinyl ether, formamidoethyl vinyl ether; other vinyl monomers such as vinylpyridine, N-vinyl caprolactam; and other polymerizable or copolymerizable unsaturates such as tetrafluoroethylene, diethyl fumarate, dimethyl maleate, N-vinyl-N,N'-ethyleneurea, and the like. In addition, soluble and insoluble copolymers may be formed by copolymerization of the compounds of Formula II with polyethylenically unsaturated compounds such divinylbenzene, ethylene-bis-acrylate, divinyl ether of ethylene glycol, N,N'-bis-vinyoxyethylurea, diallylphthalate and the like.

Both the monomers and the polymers of the present invention may be modified by reaction with numerous materials. One important class of such materials include the alkylene oxides such as ethylene oxide, propylene oxide, or trimethylene oxide. Anywhere from 1 mole to 100 moles of alkylene oxide may be reacted per hydroxyl group in the monomeric or polymeric compounds. Preferably one to 10 moles of ethylene oxide are employed. The reaction with the alkylene oxide may be carried out in an alkaline aqueous medium such as in an aqueous solution of 1% to 5% of sodium or potassium hydroxide or carbonate at a temperature of 50° to 100° C. for a period of 1 to 10 hours.

The monomeric compounds of the invention are generally of crystalline character having melting points which vary from just above room temperature up to well over 100° C. depending upon the various substituents in the amine as well as the molecular size of the amine and the acid whose derivative is reacted with the amine. Where A is short as in the case of ethylene and propylene, and R is small as in the case of hydrogen or methyl, and the acid itself is essentially hydrophilic and water-soluble in character, the products of the present invention are also highly water-soluble. Water-solubility is retained even with relatively high molecular weight monomers when numerous hydroxyl groups are also present to compensate for the increased hydrocarbon content of the higher molecular weight compounds of the present invention. When the hydrophobic component or components of the monomeric compounds are quite large and adequate hydroxyl groups are present to impart strong hydrophilic character to the acid residue in the compounds, the products have surface-activity and their polymers also show surface-activity. Such compounds are useful as wetting agents, dispersing agents and emulsifying agents in the textile, leather and paper industries. The hydrophilic character of many of the compounds may be enhanced by the introduction of ethylene oxide units.

The monomeric compounds as well as their alkylene oxide derivatives which are of water-soluble character are useful as humectants or softeners, for example in cosmetics, such as hand lotions, facial lotions, also for softening cellophane, rayon, wrapping papers, tobacco and the like. For this purpose, they may be combined with conventional softening agents such as glycerine, the lower glycols, such as ethylene glycol, diethylene glycol, and urea.

Those monomeric compounds which contain a large hydrophobic group and a relatively small hydroxyl content, insufficient to offset the hydrophobic character of the main part of the molecule, are valuable as wax substitutes and as components of compositions intended to coat or impregnate leather, paper, cellophane, or textiles with a water-repellent or water-proofing finish.

Because of the hydroxyl groups the monomeric amides of the present invention are capable of reacting with aldehydes, such as formaldehyde or acetaldehyde, or acids, such as acetic, lauric, phthalic, and maleic acids. Hence, they may be employed as modifying components in conjunction with other reactive resin-forming materials, such as the aminoplasts of which urea-formaldehyde, melamine-formaldehyde, and mixed melamine-urea-formaldehyde condensates are representative; in alkyd types of condensation products such as glycerol-phthalates and styrene-maleic anhydride copolymers.

Like the monomers, the polymers obtained have a wide range of properties and may range from water-soluble to water-insoluble and highly water-repellent compounds. In all of such polymers, however, the presence of hydroxyl groups and H atoms on the amido nitrogen provides reaction sites for the cross-linking of the polymers by condensation with difunctional reacting materials such as diacids, aldehydes, and so on. Like the monomers, the polymers and copolymers of the monomeric compounds of the present invention are useful as modifying components of reactive thermosetting types of resin-forming compositions including the aminoplasts mentioned above, the alkyds, epoxides, phenol-aldehyde resins, and so on. The water-soluble and water-sensitive polymers and copolymers may be used as dressing, finishing, conditioning and coating agents for paper, leather, and textiles of all sorts. They are especially valuable as warp sizes and as thickeners or protective colloids in conjunction with other dispersible materials, such as glue, gelatin, starch, dextrin, and the like. Certain of the polymers as well as copolymers which have proper balance between a highly hydrophobic portion in the molecule and a strongly hydrophilic portion are useful as wetting agents, dispersing agents and so on. Others of the polymers which have a highly hydrophobic character may be converted to suitable wetting agents by reaction with alkylene oxides and especially ethylene oxide to introduce sufficient thereof to impart a strongly hydrophilic portion to the polymer molecule.

The polymers which are of water-soluble character are useful in water-based emulsion paints, such as those based on emulsions of polyvinyl acetate or polyacrylates, when added in amounts of 1 to 3% of the weight of the main resin in the emulsion. Such additions improve the brushing characteristics of the paints and impart better "wet-edge" characteristics so that application of the paint to an adjoining area may be effected after substantial periods of time with less risk of lifting the previously applied coating or excessive thickness where the edges overlap.

The monomeric compounds having the structure of Formula V are generally of low toxicity and their polymers may be used as substitutes for blood plasma. The monomeric compounds of the present invention may be copolymerized in relatively small proportions ranging from 1 to 10 mole percent or more with 99–90 or less mole percent of other non-reactive monomers such as methyl methacrylate to impart in the copolymer obtained the capacity to react with other materials and thereby adapting the polymer of the other type of comonomer to be used as a modifier for aminoplasts, alkyd resins and epoxy resins. Such products are quite useful as pigment-binding compositions in the coating of papers or the pigment-dyeing of textiles. The copolymers may be used in a wide range of proportions from 15% to 25% by weight of the pigment in the case of coating of papers or 200% on the weight of the pigment in the case of pigment-dyeing of certain textiles. In these compositions, such pigments as clay, titanium dioxide, calcium carbonate, zinc oxide, lithopone and the like may be used.

The following examples, in which the parts given are by weight unless otherwise noted, are illustrative of the invention:

*Example 1*

(a) Molar quantities of 2-aminoethyl vinyl ether (87) and methyl lactate (104) are mixed and allowed to stand at 25° C. for one week. The low boiling solvents are stripped and the residue distilled, B. P. 132/0.3 mm. Hg pressure. The product, N-vinyloxyethyl-lactamide, is a light yellow oil that solidifies on cooling and on being recrystallized from ether, has a M. P. of 51–53.5° C. It is crystalline and water-soluble.

A highly flexible condition is obtained in cellophane when it is impregnated with 5% on the weight of the cellophane of a mixture of 70 parts by weight of the N-vinyloxyethyl-lactamide with 30 parts of glycerine.

(b) A mixture of one mole of glycollic acid chloride with 2 moles of 3-methylaminopropyl vinyl ether in chloroform is reacted at 0 to 10° C. for 16 hours. The hydrochloride that precipitates is removed by filtration and the filtrate is concentrated at reduced pressure. After stripping, the product, N-methyl-N-(3-vinyloxypropyl)-glycollamide, is recrystallized from ether and recovered as a white crystalline solid.

(c) The procedure of part b is repeated with one mole of glyceric acid chloride and 2 moles of 3-phenylaminopropyl vinyl ether but the temperature is kept at 45° C. A solid crystalline product, N-phenyl-N-(3-vinyloxypropyl)-glyceramide is obtained.

(d) The procedure of part b is repeated with a mixture of one mole of ricinoleic acid chloride and two moles of 2-(benzylamino)ethyl vinyl ether. A crystalline waxy solid, N-benzyl-N-(vinyloxyethyl)-ricinoleamide, is obtained. An aqueous emulsion containing 10% of the product dispersed by means of a tert-octyl phenoxypolyethoxyethanol containing about 10 oxyethylene units per molecule is a good material for coating textiles and leather to render the surfaces thereof water-repellent.

*Example 2*

(a) A mixture of d-glucono-delta-lactone, 44.5 g. (0.25 mole) and 2-aminoethyl vinyl ether, 25 g. (0.29 mole) in 125 ml. methanol is heated to reflux, filtered hot and cooled. The resultant solid is recrystallized from methanol to give 56 grams (80% yield) of the white, crystalline product, N - vinyloxyethyl - d - gluconamide, M. P. 125° to 128° C. The product is soluble in hot ethyl acetate while the starting lactone is not. The product is also water-soluble.

(b) In the same fashion, ¼ mole each of α-di-glucoheptono-delta-lactone and 2-amino-1-hexadecylethyl vinyl ether are reacted. A water-dispersible surface-active amide is obtained.

Example 3

(a) A mixture of butyrolactone, 94 grams (1.1 mole), and 2-aminoethyl vinyl ether, 87 grams (1.0 mole) is heated at 100° C. for 3 hours. No exotherm is observed during the mixing or subsequent heating. Distillation gives 149 grams of product, N-vinyloxyethyl-4-hydroxybutyramide, B. P. 165° to 167°/0.3 mm. Hg that solidifies on cooling. The material is recrystallized from a large amount of ethylene dichloride containing 5% to 10% of ether. The product is quite hydroscopic and water-soluble.

Cellophane impregnated with 4% of the product hereof on the weight of the cellophane is rendered highly flexible.

(b) The procedure of part a is repeated substituting 100 grams of N-methyl-2-aminoethyl vinyl ether for the vinyl ether thereof.

Example 4

(a) A mixture of ½ gram-mole of the acid chloride of 4-hydroxy-cyclohexane-1-carboxylic acid, ½ gram-mole of potassium carbonate, and ½ gram-mole of 2-aminoethyl vinyl ether in a mixture of 250 cc. benzene and 50 cc. water is agitated at 30° C. for 24 hours. A white product, N - (vinyloxyethyl) - 4 - hydroxy - cyclo - hexane-1-carboxamide, is obtained.

(b) In the same way a white, water-soluble solid amide is obtained by heating at 30° C. with agitation for 20 hours a mixture of ½ mole of the acid chloride of quinic acid with ½ mole of 2-aminoethyl vinyl ether using a mixture of 50 cc. water and 200 cc. chloroform as the reaction medium in the presence of ½ mole of sodium carbonate.

Example 5

(a) The monomeric N-vinyloxyethyl-lactamide obtained by the procedure of Example 1 (a) is heated to 75° C. for 16 hours with 2% of dimethylazoisobutyrate. A water-soluble homopolymer is produced which is useful as a warp sizing composition, especially for rayon and cotton.

(b) Another composition useful for the warp sizing of cotton and rayon is obtained by reacting the homopolymer obtained in part a hereof with ethylene oxide in an aqueous solution containing 1% sodium hydroxide. The reaction is effected at 40° C. in a closed vessel into which the ethylene oxide is introduced as a liquid in an amount equal to 4 times the weight of the polymer.

Example 6

The monomeric N-vinyloxyethyl-d-gluconamide obtained by the procedure of Example 2 (a) is polymerized by the procedure of Example 5 (a) as a solution in water at 50% solids. The polymer obtained is a hydroscopic solid useful as a softener for cellophane, for which purpose it is introduced in an amount from 3% to 8% on the weight of the cellophane.

Example 7

A mixture of one mole of the monomeric N-vinyloxyethyl-4-hydroxybutyramide obtained by the procedure of Example 3 (a) with 9 moles of butyl methacrylate emulsified in water by means of about 3% (on the weight of the monomers) of tert-octyl-phenoxypolyethoxyethanol containing an average of 10 ethylene oxide units is heated at 25° to 40° C. for 8 hours with 0.3% of sodium persulfate and 1% of triethylene tetramine based on the weight of the monomers. To the copolymer dispersion obtained there is added 5 times the weight of the dispersed copolymer of a mixture of 7 parts of clay with 3 parts of titanium dioxide. This composition is excellent for coating paperboard.

Example 8

Two parts by weight of monomeric N-vinyloxyethyl-lactamide is mixed with 8 parts by weight of ethyl acrylate and 10 parts by weight of dimethylformamide. Then 0.15 part by weight of dimethylazoisobutyrate is added and the mixture is heated at 80° C. for 12 hours. The polymer thus obtained may be mixed with nitrogen resins such as butylated urea-formaldehyde condensates in approximately equal parts by weight of resin. Such a mixture when catalyzed with 0.1 to 0.5% of acid such as butyl phosphoric acid, filmed on glass, wood or metal panels, and baked at 300° F. for 30 minutes gives tough, insoluble, resistant coatings with good adhesion.

Example 9

Eight parts by weight of butyl acrylate is emulsified in 40 parts by weight of water by means of 0.3 part by weight of tert-octyl phenoxypolyethoxyethanol having an average of 10 ethylene oxide units per molecule. Two parts by weight of monomeric N-vinyloxyethyl-lactamide is introduced and 0.3 part by weight of ammonium persulfate and 1% of diethylene triamine are introduced as a catalyst and activator. The mixture is heated at 35° to 40° C. for 4 to 8 hours. The emulsion copolymer is diluted to a concentration of 10% solids and a wool fabric is immersed therein. Upon drying the treated fabric and heating it to 120° C. for three minutes, the fabric exhibits reduced shrinkage (about 6%) upon subsequent washing as compared to the untreated fabric (about 45%). A second wool fabric may be impregnated with the same diluted emulsion in which 5% of formaldehyde (percentage based on the weight of dispersed copolymer) is dissolved. The second fabric after drying and curing at the same temperature and for the same time as the first shows somewhat greater reduction in shrinkage on washing (about 3.5%) as compared to the previously treated fabric. In both cases, practical shrinkage stabilization is obtained.

Example 10

The monomeric amide obtained by the procedure of Example 2 (a) is heated to 75° C. in the presence of sufficient water to dissolve it at that temperature. Then 0.2% (on the weight of the amide) of dimethylazoisobutyrate is added and the heating at 75° C. is continued with agitation throughout a period of 15 hours. The polymeric product is introduced into a water-based paint of the type comprising emulsified polyvinyl acetate in an amount such as to provide 3% of the polymeric amide on the weight of the polyvinyl acetate. The paint exhibited excellent brushing quality.

Example 11

A mixture of 50 parts by weight of the monomeric amide obtained by the procedure of Example 3 (a) with 50 parts by weight of N-vinylpyrrolidone is dissolved in 100 parts by weight of water and 2 parts by weight of dimethylazoisobutyrate is added as a catalyst. The mixture is heated at 75° C. for 20 hours to produce the copolymer. Twenty-five parts by weight of the copolymer thus obtained is mixed with 75 parts by weight of aqueous resin-forming urea-formaldehyde condensate containing an acid catalyst. There is obtained a viscous thermosetting adhesive composition.

Example 12

An emulsion copolymer of 70 parts of acrylonitrile, 20 parts of ethyl acrylate and 10 parts of the monomer of Example 3 (a) is prepared by the procedure of Example 9. This material is useful in the preparation of fibers or films which have better dye-receptivity and moisture retention as a result of the presence of polymerized monomeric units of Example 3.

In spinning there may be incorporated nitrogen resins such as bis-butoxymethylethyleneurea which subsequently react with the hydroxyl groups in the polymer to give thermoset fibers, films or castings. Acid catalysts are preferably included to accelerate such reaction.

Example 13

(a) A copolymer was prepared from 90 mole percent of methyl methacrylate and 10 mole percent of N-vinyloxyethyl-N-methyl-4-hydroxybutyramide at 40% solids in ethoxyethyl acetate using 0.5% azodiisobutyronitrile as catalyst at 80° C. The resultant resin had a Gardner-Holdt viscosity of Z-2 (approx. 36 poise).

(b) A terpolymer was prepared from 50 mole percent of methyl methacrylate, 40 mole percent of ethyl acrylate and 10 mole percent of N-methyl-N-vinyloxyethyl-4-hydroxybutyramide by the process of part *a* hereof. The Gardner-Holdt viscosity was U (6.3 poise).

(c) A terpolymer was prepared from 80 mole percent of methyl methacrylate, 10 mole percent of acrylonitrile and 10 mole percent of the vinyl ether of part *a* by the procedure of part *a*. The Gardner-Holdt viscosity was Z (23 poise).

(d) Each of the resins of parts *a*, *b*, and *c* were mixed with 20 parts by weight of bis-methoxymethyl ethyleneurea and 0.5 part by weight of p-toluenesulfonic acid. Each of these mixes were filmed on steel panels and baked at 300° F. for 30 minutes. The resultant films were clear, insoluble in solvent and showed good adhesion. They varied in Koh-i-noor pencil hardness from 2H (resin of part *b*) to 6H resin of part *a*) and 8H (resin of part *c*) with corresponding changes in flexibility. Each of the mixes were pigmented with 50% pigment (a 50:50 mixture of titanium dioxide and zinc oxide) on resin and filmed to give smooth, glossy, hard, solvent-resistant finishes after baking as described above suitable for use on appliances such as refrigerators, washers, stoves and the like.

It is to be understood that changes and variations may be made without departing from the spirit and scope of the invention as defined in the appended claims.

I claim:

1. A composition comprising a compound selected from the group consisting of amides of an aliphatic monocarboxylic acid of 2 to 18 carbon atoms containing at least one hydroxyl group and a vinyloxyalkylamine having the structure of the formula $$CH_2=CHOANHR$$

where

A is an alkylene group having 2 to 18 carbon atoms of which at least two in a chain separate the adjoining nitrogen and ether oxygen atoms, and
R is selected from the group consisting of H, phenyl, tolyl, benzyl, cyclohexyl, and alkyl groups having from 1 to 18 carbon atoms.

2. A composition comprising a polymer of a compound of claim 1.

3. A composition comprising a compound having the structure of formula $$CH_2=CHOANRCOC_xH_{2x+1-y}(OH)_y$$

where

A is an alkylene group having 2 to 18 carbon atoms of which at least two in a chain separate the adjoining nitrogen and ether oxygen atoms,
R is an alkyl group having from 1 to 18 carbon atoms,
*x* is an integer having a value of 1 to 17, and
*y* is an integer having a value of 1 to 5.

4. A composition comprising a polymer of a compound of claim 3.

5. A composition comprising a compound having the structure of formula $$CH_2=CHOANHCOC_xH_{2x+1-y}(OH)_y$$

where

A is an alkylene group having 2 to 18 carbon atoms of which at least two in a chain separate the adjoining nitrogen and ether oxygen atoms,
*x* is an integer having a value of 1 to 17, and
*y* is an integer having a value of 1 to 5.

6. A composition comprising a polymer of a compound of claim 5.

7. A composition comprising a compound having the structure of formula $$CH_2=CHOANHCOR'(OH)_p$$

where

A is an alkylene group having 2 to 18 carbon atoms of which at least two in a chain separate the adjoining nitrogen and ether oxygen atoms,
R' is an alicyclic hydrocarbon radical having 6 carbon atoms in a ring, and
*p* is an integer having a value of 1 to 4.

8. A composition comprising a polymer of a compound of claim 7.

9. A composition comprising a compound having the structure of formula $$CH_2=CHOANHCO(CH_{2m-1}CH(OH)R^2$$

where

A is an alkylene group having 2 to 18 carbon atoms of which at least two in a chain separate the adjoining nitrogen and ether oxygen atoms,
$R^2$ is an alkyl group having 1 to 3 carbon atoms, and
*m* is an integer having a value of 1 to 6.

10. A composition comprising a polymer of a compound of claim 9.

11. A composition comprising a compound having the structure of formula $$CH_2=CHOANHCO(-\underset{\underset{H}{O}}{\overset{H}{C}}-)_nH$$

where

A is an alkylene group having 2 to 18 carbon atoms of which at least two in a chain separate the adjoining nitrogen and ether oxygen atoms, and
*n* is an integer having a value of 1 to 6.

12. A composition comprising a polymer of a compound of claim 11.

13. As a new composition of matter, N-vinyloxyethyl-lactamide.

14. As a new composition of matter, N-vinyloxyethyl-d-gluconamide.

15. As a new composition of matter, N-vinyloxyethyl-4-hydroxy-butyramide.

16. As a new composition of matter, N-methyl-N-vinyloxyethyl-4-hydroxy-butyramide.

17. As a new composition of matter, a polymer of N-methyl-N-vinyloxyethyl-4-hydroxy-butyramide.

18. As a new composition of matter, a polymer of N-vinyloxyethyl-lactamide.

19. As a new composition of matter, a polymer of N-vinyloxyethyl-d-gluconamide.

20. As a new composition of matter, a polymer of N-vinyloxyethyl-4-hydroxy-butyramide.

21. As a new composition of matter, a copolymer of N-vinyloxyethyl-4-hydroxy-butyramide with an ester of a monohydric alcohol with an acid selected from the group consisting of acrylic and methacrylic acids.

22. As a new composition of matter, a copolymer of N-vinyloxyethyl-lactamide with an ester of a monohydric alcohol with an acid selected from the group consisting of acrylic and methacrylic acids.

23. As a new composition of matter, a copolymer of N - methyl - N - vinyloxyethyl - 4 - hydroxy - butyramide with an ester of a monohydric alcohol with an acid selected from the group consisting of acrylic and methacrylic acids.

References Cited in the file of this patent

UNITED STATES PATENTS 2,686,173   Sauer _____ Aug. 10, 1954